(12) United States Patent
Ito (10) Patent No.: US 11,932,253 B2
(45) Date of Patent: Mar. 19, 2024

(54) VEHICLE CONTROL METHOD AND VEHICLE CONTROL DEVICE

(71) Applicant: Nissan Motor Co., Ltd., Yokohama (JP)

(72) Inventor: Atsushi Ito, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 492 days.

(21) Appl. No.: 17/265,358

(22) PCT Filed: Aug. 6, 2018

(86) PCT No.: PCT/JP2018/029441
§ 371 (c)(1),
(2) Date: Feb. 2, 2021

(87) PCT Pub. No.: WO2020/031238
PCT Pub. Date: Feb. 13, 2020

(65) Prior Publication Data
US 2021/0253108 A1 Aug. 19, 2021

(51) Int. Cl.
*B60W 30/18* (2012.01)
*B60W 30/182* (2020.01)
*B60W 40/105* (2012.01)

(52) U.S. Cl.
CPC .... *B60W 30/18163* (2013.01); *B60W 40/105* (2013.01); *B60W 2554/4041* (2020.02);
(Continued)

(58) Field of Classification Search
CPC ......... B60W 30/18163; B60W 40/105; B60W 2554/4041; B60W 2554/4042; B60W 2554/80; B60W 2555/60; B60W 2552/00; B60W 2552/30; B60W 30/182; B60W 2556/50; B60W 2720/10
(Continued)

(56) References Cited

U.S. PATENT DOCUMENTS

2014/0195093 A1\* 7/2014 Litkouhi ......... B60W 30/18163
701/23
2015/0166062 A1\* 6/2015 Johnson ................. G08G 1/167
701/41
(Continued)

FOREIGN PATENT DOCUMENTS

DE 102012023107 A1 6/2014
EP 3339124 A1 6/2018
(Continued)

*Primary Examiner* — Ian Jen
*Assistant Examiner* — Hossam M Abd el Latif
(74) *Attorney, Agent, or Firm* — Young Basile Hanlon & MacFarlane, P.C.

(57) ABSTRACT

A vehicle control method includes: detecting, on a planned travel route of a host vehicle, a merging section in which a travel lane in which the host vehicle is traveling merges with another lane; determining whether or not to execute merging assistance control for assisting the host vehicle to change lanes into the other lane in the merging section; and when the merging assistance control is determined not to be executed in the merging section, controlling the speed of the host vehicle to be a predetermined speed or less before the host vehicle passes through a starting point of the merging section.

6 Claims, 8 Drawing Sheets

(52) U.S. Cl.
CPC . *B60W 2554/4042* (2020.02); *B60W 2554/80* (2020.02); *B60W 2555/60* (2020.02)

(58) Field of Classification Search
USPC .......................................................... 701/41
See application file for complete search history.

(56) References Cited

U.S. PATENT DOCUMENTS

| | | | |
|---|---|---|---|
| 2015/0345964 A1* | 12/2015 | Oooka | B60W 30/143 |
| | | | 701/41 |
| 2016/0214612 A1* | 7/2016 | Kashiba | B60W 10/184 |
| 2016/0257288 A1* | 9/2016 | Miller | B60W 30/18109 |
| 2017/0088144 A1 | 3/2017 | Shibata | |
| 2017/0120912 A1* | 5/2017 | Ishioka | B60W 30/16 |
| 2017/0203764 A1* | 7/2017 | Fujiki | B60W 10/04 |
| 2017/0369055 A1* | 12/2017 | Saigusa | G08G 1/161 |

FOREIGN PATENT DOCUMENTS

| | | |
|---|---|---|
| JP | 2006-285731 A | 10/2006 |
| JP | 2017-019397 A | 1/2017 |
| JP | 2017-062739 A | 3/2017 |
| JP | 2017-124743 A | 7/2017 |
| JP | 2018-052326 A | 4/2018 |

\* cited by examiner

VEHICLE CONTROL METHOD AND VEHICLE CONTROL DEVICE

TECHNICAL FIELD

The present invention relates to a vehicle control method and a vehicle control device.

BACKGROUND

JP 2017-124743 A describes a merging assistance device that assists a host vehicle traveling in a first lane to merge into a second lane. The merging assistance device includes an acceleration unit that accelerates the host vehicle up to a target speed in the first lane, a lane change unit that causes the host vehicle to change lanes from the first lane to the second lane, a distance A acquisition unit that acquires a distance A from the host vehicle to a reference point, a host vehicle speed acquisition unit that acquires a speed of the host vehicle, a travel distance B calculation unit that calculates a distance B to be traveled before the host vehicle stops at a preset deceleration, and a stop unit that stops merging assistance on condition that a value resulting from subtraction of the traveled distance B from the distance A is smaller than a preset threshold value.

SUMMARY

The merging assistance device disclosed in JP 2017-124743 A determines to stop merging assistance depending on the situation around the host vehicle after starting the merging assistance. Stopping the merging assistance in the middle of a merging section may shorten a remaining distance where the driver can accelerate the host vehicle in the merging section. Therefore, it may be difficult to perform speed adjustment for changing lanes by acceleration operation.

It is an object of the present invention to facilitate a driver to perform speed adjustment for changing lanes by acceleration operation when not executing merging assistance control that assists a host vehicle to change to another lane in a merging section where a travel lane in which the host vehicle traveling merges with the other lane.

According to one aspect of the present invention, there is provided a vehicle control method including: detecting, on a planned travel route of a host vehicle, a merging section in which a travel lane in which the host vehicle is traveling merges with another lane; determining whether or not to execute merging assistance control for assisting the host vehicle to change lanes into the other lane in the merging section; and when the merging assistance control is determined not to be executed in the merging section, controlling the speed of the host vehicle to be a predetermined speed or less before the host vehicle passes through a starting point of the merging section.

According to the aspect of the present invention, it is possible to facilitate a driver to perform speed adjustment for changing lanes by acceleration operation when not executing merging assistance control.

The object and advantages of the invention will be realized and attained by means of the elements and combinations particularly pointed out in the claims. It is to be understood that both the foregoing general description and the following detailed description are exemplary and explanatory and are not restrictive of the invention.

DETAILED DESCRIPTION

Hereinafter, embodiments of the present invention will be described with reference to the drawings.

(Structure)

Figure 1:
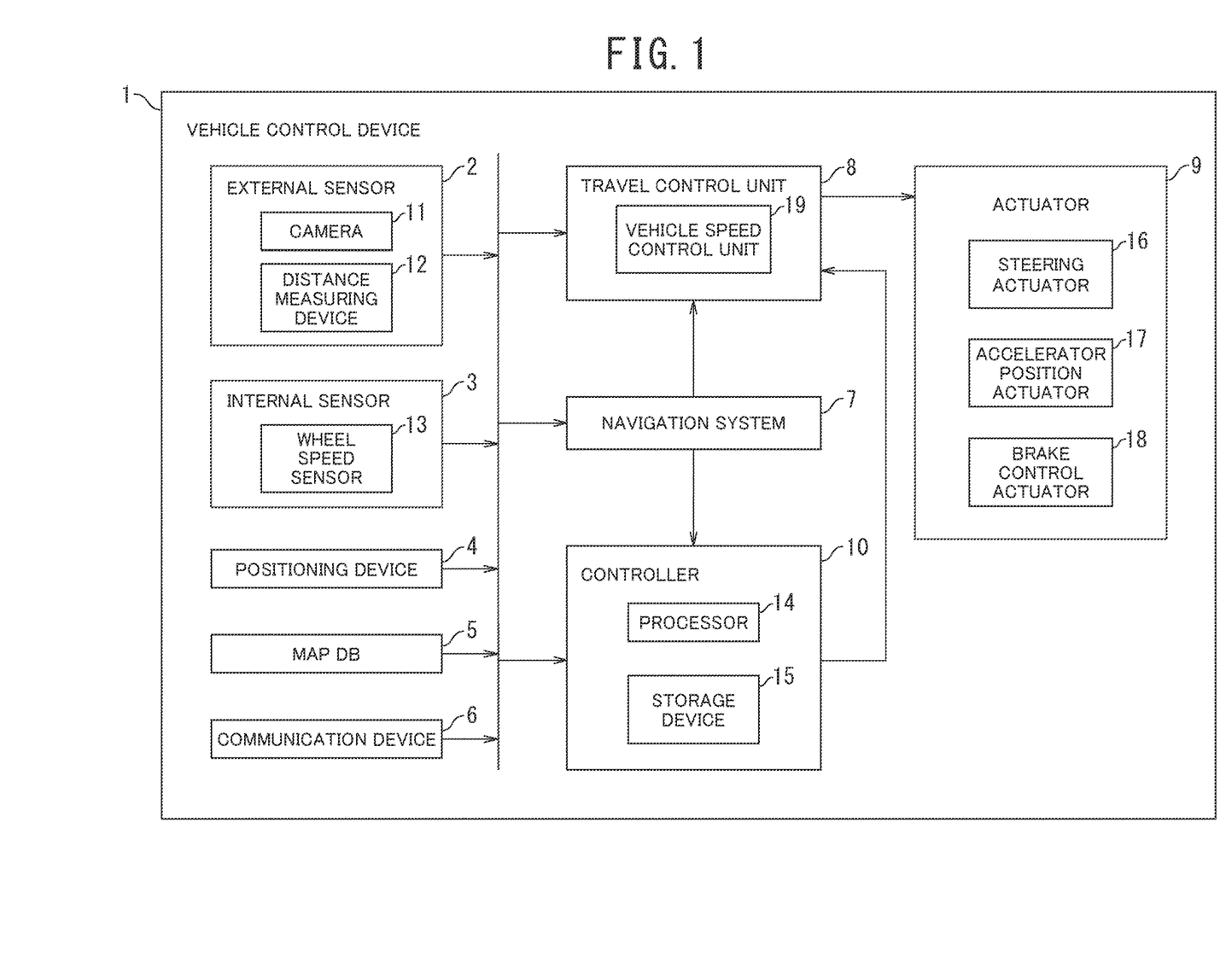
FIG. 1 is a schematic structural diagram of an example of a vehicle control device of an embodiment.

Reference will be made to FIG. 1. On a basis of a travel environment around a vehicle (hereinafter referred to as "host vehicle") mounted with a vehicle control device 1, the vehicle control device 1 performs automatic driving control for automatically driving the host vehicle without involvement of a driver and driving assistance control for assisting the driver to operate the host vehicle.

The driving assistance control may include automatic steering, automatic braking, constant speed travel control, lane keeping control, merging assistance control, and the like.

The vehicle control device 1 includes an external sensor 2, an internal sensor 3, a positioning device 4, a map database 5, a communication device 6, a navigation system 7, a travel control unit 8, an actuator 9, and a controller 10. Note that in the attached drawings, the map database is illustrated as "MAP DB".

The external sensor 2 is a sensor configured to detect a surrounding environment of the host vehicle, for example, objects around the host vehicle. The external sensor 2 may include, for example, a camera 11 and a distance measuring device 12.

The camera 11 and the distance measuring device 12 detect the surrounding environment of the host vehicle, including objects present around the host vehicle (for example, features such as other vehicles, pedestrians, white lines such as lane boundary lines and lane markings, traffic lights, stop lines, signs, buildings, utility poles, curbs, and crosswalks provided on roads or around the roads), relative positions of the objects with respect to the host vehicle, and relative distances between the host vehicle and the objects.

The camera 11 may be, for example, a stereo camera. The camera 11 may be a monocular camera, in which the same object may be photographed from a plurality of viewpoints by the monocular camera, and a distance to the object may be calculated. Additionally, the distance to the object may be calculated on a basis of a ground contact position of the object detected from an image captured by the monocular camera.

The distance measuring device 12 may be, for example, a laser range-finder (LRF), a radar unit, or a laser scanner unit.

The camera 11 and the distance measuring device 12 output surrounding environment information that is information about the detected surrounding environment to the navigation system 7, the travel control unit 8, and the controller 10.

The internal sensor 3 is a sensor that detects a traveling state of the host vehicle. The internal sensor 3 may include, for example, a wheel speed sensor 13. The wheel speed sensor 13 detects a wheel speed of the host vehicle.

The internal sensor 3 may include, for example, an acceleration sensor that detects acceleration generated in the host vehicle and a gyro sensor that detects an angular velocity of the host vehicle.

The internal sensor 3 outputs traveling state information that is information about the detected traveling state to the navigation system 7, the travel control unit 8, and the controller 10.

The positioning device 4 receives radio waves from a plurality of navigation satellites to acquire a current position of the host vehicle, and outputs the acquired current position of the host vehicle to the navigation system 7, the travel control unit 8, and the controller 10. The positioning device 4 may include, for example, a global positioning system (GPS) receiver or another global positioning system (global navigation satellite system: GNSS) receiver other than the GPS receiver.

The map database 5 stores road map data.

The road map data includes shapes (lane shapes) and coordinate information about the white lines such as lane boundary lines and lane markings, altitudes of roads and the white lines, and coordinate information about features such as traffic lights, stop lines, signs, buildings, utility poles, curbs, and crosswalks provided on roads or around the roads.

The road map data may further include information about road types, road slopes, the numbers of lanes, speed limits (legal speeds), road widths, the presence or absence of merging points, and the like. The road types may include, for example, general roads and highways.

The map database 5 is referred to by the navigation system 7, the travel control unit 8, and the controller 10.

The communication device 6 performs wireless communication with a communication device outside the host vehicle. A communication system by the communication device 6 may be, for example, wireless communication via a public land mobile network, vehicle-to-vehicle communication, road-to-vehicle communication, or satellite communication.

The navigation system 7, the travel control unit 8, and the controller 10 may acquire road map data by the communication device 6 from an external information processing device in place of or in addition to the map database 5.

The navigation system 7 provides a route guidance to a destination set on a map by the driver of the host vehicle to occupant(s) of the host vehicle. The navigation system 7 uses the various kinds of information input from the external sensor 2, the internal sensor 3, and the positioning device 4 to estimate the current position of the host vehicle, generates a route to the destination, and provides the route guidance to the occupant(s). The navigation system 7 outputs the route information to the travel control unit 8 and the controller 10.

The travel control unit 8 performs drive assistance control of the host vehicle, such as constant speed travel control and merging assistance control, and automatic drive control thereof.

For example, in the constant speed travel control, a set speed is set on the basis of input operation by the driver and speed limit information output from the navigation system 7. The travel control unit 8 drives the actuator 9 to adjust the speed of the host vehicle so that the host vehicle is driven at the set speed. Additionally, the travel control unit 8 stops the constant speed travel control when the driver performs a braking operation (for example, a brake pedal operation).

For example, the merging assistance control may include automatic merging control for causing the host vehicle to automatically change lanes in a merging section. In the automatic merging control, the travel control unit 8 detects a merging section on a route that the host vehicle will travel from now on the basis of the current position of the host vehicle, the road map data of the map database 5, and the route information output from the navigation system 7.

The travel control unit 8 sets a target travel trajectory for causing the host vehicle to change lanes in the merging section on the basis of the surrounding environment detected by the external sensor 2 and the traveling state of the host vehicle detected by the internal sensor 3. The travel control unit 8 drives the actuator 9 to perform steering control and acceleration/deceleration control of the host vehicle so that the host vehicle travels along the target travel trajectory.

In addition, the merging assistance control may perform turn signal control in addition to or in place of the steering control and acceleration/deceleration control to assist merging of the host vehicle in the merging section. Additionally, the merging assistance control may present displays of speed, steering, and the like to the driver or indicate timing to assist merging of the host vehicle.

For example, in the automatic merging control, the target travel trajectory along which the host vehicle is to travel is set on the basis of the current position of the host vehicle, the road map data, the route information, the surrounding environment, and the traveling state of the host vehicle. The travel control unit 8 drives the actuator 9 to perform the steering control and acceleration/deceleration control of the host vehicle so that the host vehicle travels along the target travel trajectory.

In response to a control signal output from the travel control unit 8, the actuator 9 operates a steering wheel, an accelerator opening, and a brake device of the vehicle to generate a vehicle behavior of the vehicle.

The actuator 9 includes a steering actuator 16, an accelerator position actuator 17, and a brake control actuator 18.

The steering actuator 16 controls a steering direction and a steering amount of steering of the vehicle. The accelerator position actuator 17 controls an accelerator position of the vehicle. The brake control actuator 18 controls braking motion of the brake device of the vehicle.

The controller 10 is an electronic control unit (ECU) that performs merging assistance for the host vehicle. The controller 10 includes a processor 14 and a peripheral component such as a storage device 15. The processor 14 may be, for example, a central processing unit (CPU) or a microprocessing unit (MPU).

The controller 10 may be an electronic control unit integrated with the travel control unit 8 or may be a separate electronic control unit.

The storage device 15 may include any of a semiconductor storage device, a magnetic storage device, and an optical storage device. The storage device 15 may include memories, such as register, cache memory, and read only memory (ROM) and random access memory (RAM) used as primary storage.

Note that the controller 10 may be realized by a functional logic circuit set in a general-purpose semiconductor integrated circuit. For example, the controller 10 may include a programmable logic device (PLD), such as a field-programmable gate array (FPGA), or the like.

The controller 10 detects a merging section on a planned travel route that the host vehicle will travel from now.

Figure 2:
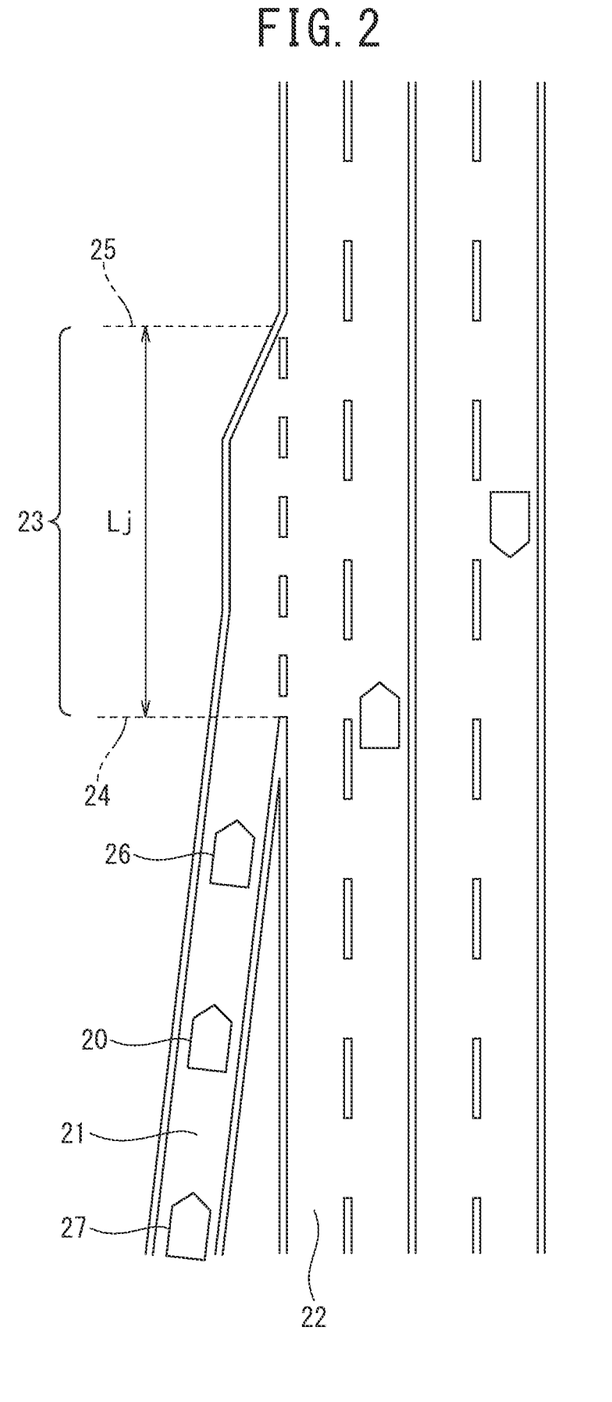
FIG. 2 is a diagram illustrating an example of a merging section.

Reference will be made to FIG. 2. The controller 10 detects, on the planned travel route, a merging section 23 where a travel lane 21 in which a host vehicle 20 is traveling merges with another lane 22. For example, the other lane 22 may be a main lane, and the travel lane 21 may be a merging lane that merges with the main lane. Hereinafter, the travel lane 21 in which the host vehicle 20 is traveling will be referred to as "merging lane", and the other lane 22 with which the travel lane 21 merges will be referred to as "merging destination lane".

The merging section 23 is a section from a starting point 24 to an ending point 25, in which the merging lane 21 and the merging destination lane 22 are separated by broken-line lane markings.

The controller 10 determines whether or not to execute merging assistance control for assisting the host vehicle 20 to change lanes from the merging lane 21 to the merging destination lane 22 in the detected merging section. For example, the controller 10 determines whether or not to execute automatic merging control for causing the host vehicle 20 to change lanes from the merging lane 21 to the merging destination lane 22 in the detected merging section. For example, the controller 10 may determine whether or not to execute the automatic merging control on the basis of the presence or absence of road map data for use in the automatic merging control and road shape.

When the merging assistance control is not executed in the detected merging section, the controller 10 controls the speed of the host vehicle 20 to a predetermined speed v0 or less before the host vehicle 20 passes through the starting point 24 of the merging section.

In this case, for example, the controller 10 outputs the predetermined speed v0 to the vehicle speed control unit 19 of the travel control unit 8 illustrated in FIG. 1. For example, when the travel speed of the host vehicle 20 is higher than the predetermined speed v0, the vehicle speed control unit 19 may decelerate the host vehicle 20 down to the predetermined speed v0 before the host vehicle 20 passes through the starting point 24 of the merging section. For example, when the host vehicle 20 travels at the predetermined speed v0 or less, the vehicle speed control unit 19 may limit acceleration so that the speed of the host vehicle 20 does not exceed the predetermined speed v0.

Thus, by setting the speed of the host vehicle 20 to the predetermined speed v0 or less before the host vehicle 20 passes through the starting point 24 of the merging section 23, it is possible to secure a section length that allows the driver to accelerate the host vehicle in the merging section 23. This facilitates the driver to adjust speed for changing lanes only by acceleration operation.

Figure 3:
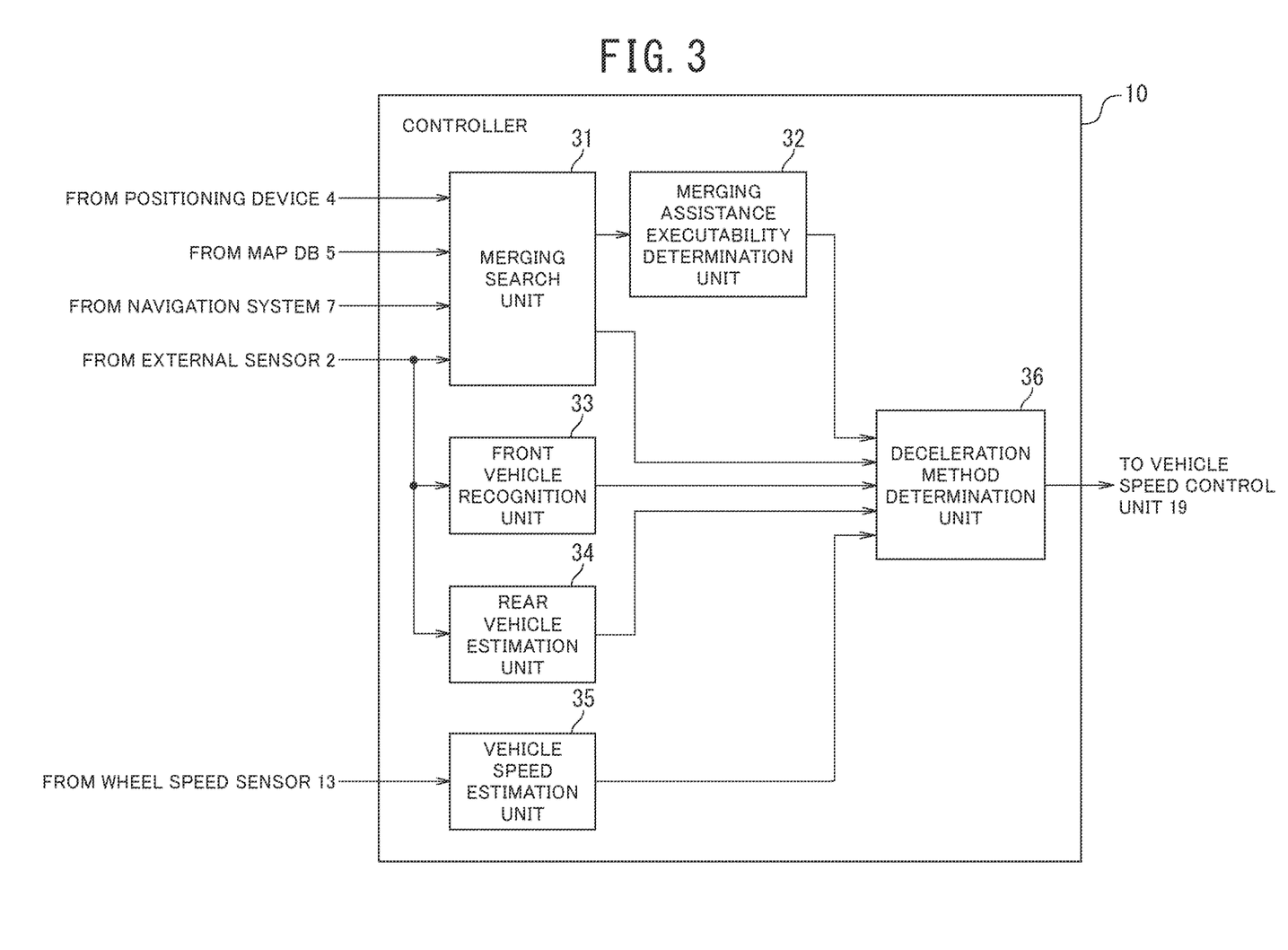
FIG. 3 is a block diagram illustrating an example of a functional structure of a controller illustrated in FIG. 1.

Next, a functional structure of the controller 10 will be described with reference to FIG. 3. The controller 10 includes a merging search unit 31, a merging assistance executability determination unit 32, a front vehicle recognition unit 33, a rear vehicle estimation unit 34, a vehicle speed estimation unit 35, and a deceleration method determination unit 36.

Functions of the merging search unit 31, the merging assistance executability determination unit 32, the front vehicle recognition unit 33, the rear vehicle estimation unit 34, and the deceleration method determination unit 36 may be realized by, for example, causing the processor 14 of the controller 10 to execute a computer program stored in the storage device 15.

The merging search unit 31 estimates the current position of the host vehicle on the basis of a measurement result on the current position of the host vehicle 20 measured by the positioning device 4, the surrounding environment detected by the external sensor 2, and the road map data of the map database 5.

The merging search unit 31 searches, from the road map data, a merging section present on a planned travel road that the host vehicle will travel in the future from the current position of the host vehicle on the basis of the route information output from the navigation system 7. The merging search unit 31 acquires information such as a shape of the detected merging section, a speed limit of the merging lane, and a speed limit of the merging destination lane.

The merging search unit 31 may use the road map data received from the external information processing device by the communication device 6 in addition to or in place of the road map data of the map database 5.

The merging search unit 31 outputs the acquired information about the merging section to the merging assistance executability determination unit 32 and the deceleration method determination unit 36.

The merging search unit 31 may output only information about a merging section closest to the host vehicle among merging sections on the planned travel road or may output information about a plurality of merging sections in order of proximity to the host vehicle.

The merging assistance executability determination unit 32 determines whether or not to execute merging assistance control by the travel control unit 8 on the basis of the information about the merging section output by the merging search unit 31.

Reference will be made to FIG. 2. For example, the merging assistance executability determination unit 32 may determine that merging assistance control is not executable when a section length Lj of the merging section 23 is shorter than a predetermined length.

Additionally, for example, the merging assistance executability determination unit 32 may determine that merging assistance control is not executable when the merging lane 21 has a curvature radius shorter than a predetermined length or when the merging destination lane 22 has a curvature radius shorter than the predetermined length.

Figure 4:
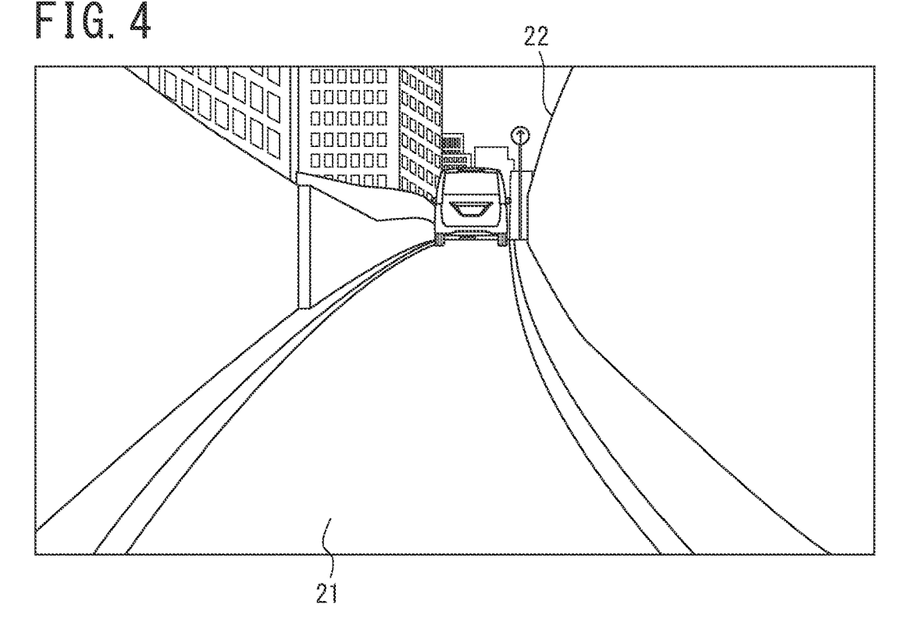
FIG. 4 is an illustrative diagram of a second example of the merging section where merging assistance control is not executed.

Reference will be made to FIG. 4. When a height difference between the merging lane 21 and the merging destination lane 22 is a predetermined value or more and the merging lane 21 is lower than the merging destination lane 22, the merging destination lane 22 is hidden in a blind spot generated by a road structure.

Therefore, the merging assistance executability determination unit 32 may determine that merging assistance control is not executable when the height difference between the merging lane 21 and the merging destination lane 22 is a predetermined value or more and the merging lane 21 is lower than the merging destination lane 22.

Figure 5:
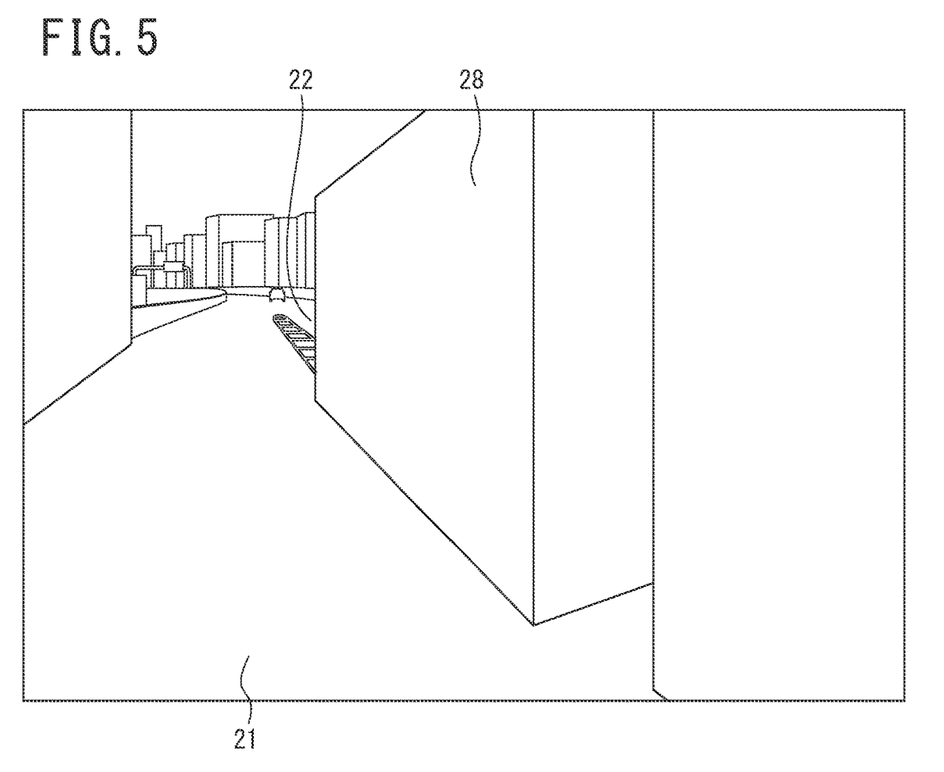
FIG. 5 is an illustrative diagram of a third example of the merging section where merging assistance control is not executed.

Reference will be made to FIG. 5. When there is a shield 28 having a predetermined height or more between the merging lane 21 and the merging destination lane 22, the merging destination lane 22 is hidden in the blind spot generated by the shield 28.

Therefore, the merging assistance executability determination unit 32 may determine that merging assistance control is not executable when there is the shield 28 having a predetermined height or more between the merging lane 21 and the merging destination lane 22.

Figure 6:
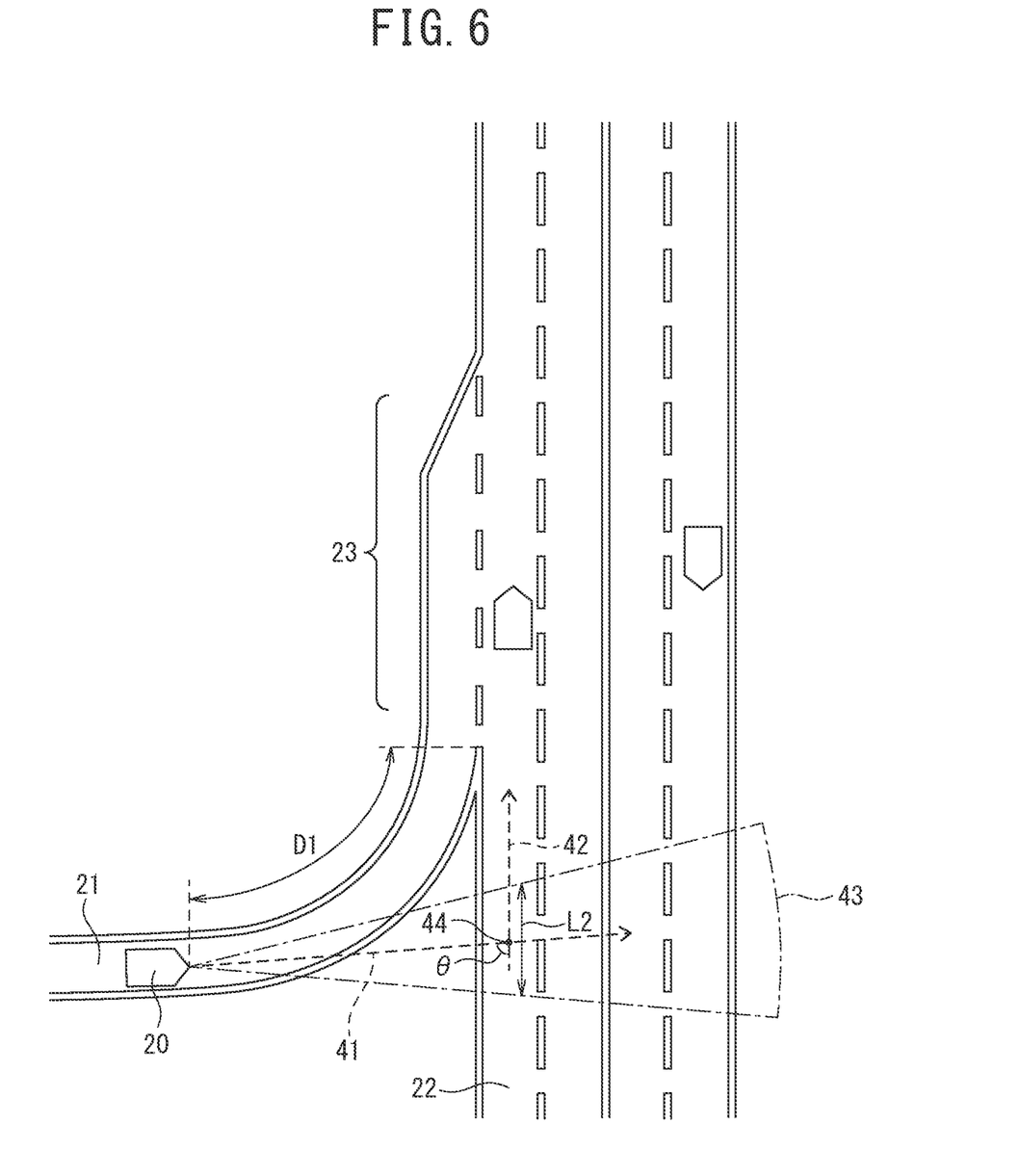
FIG. 6 is an illustrative diagram of a fourth example of the merging section where merging assistance control is not executed.
Figure 7:
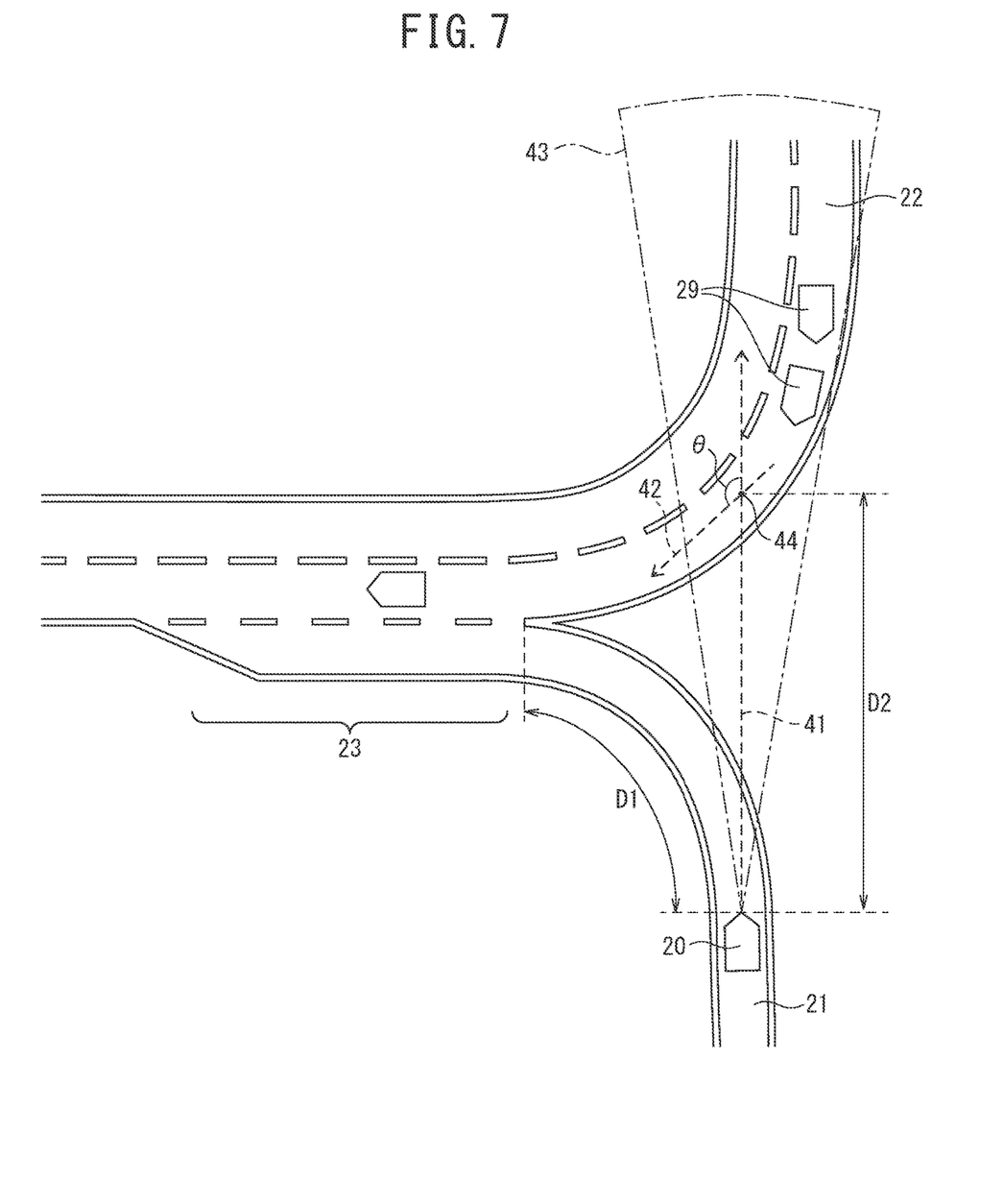
FIG. 7 is an illustrative diagram of a fifth example of the merging section where merging assistance control is not executed.

Furthermore, depending on the road shape of the merging lane 21 and the road shape of the merging destination lane 22, it is impossible to determine a traffic situation of the merging destination lane 22 before the merging section 23, so that merging assistance control may not be executable. FIGS. 6 and 7 illustrate examples where the traffic situation of the merging destination lane 22 cannot be determined from the merging lane 21 depending on the road shape.

Reference will be made to FIG. 6. When a difference θ between a traveling direction 41 of the merging lane 21 at a point located at a predetermined distance D1 before the merging section 23 and a traveling direction 42 of the merging destination lane 22 is large, a length L2 of a range of the merging destination lane 22 (i.e., a range where the external sensor 2 can detect the traffic situation) within a detection range 43 of the external sensor 2 in front of the host vehicle 20 becomes short, which may make it impossible to determine the traffic situation of the merging destination lane 22.

Reference will be made to FIG. 7. When the difference θ between the traveling direction 41 of the merging lane 21 and the traveling direction 42 of the merging destination lane 22 becomes even larger and approaches 180 degrees, other vehicles 29 traveling in the merging destination lane 22 overlap each other when seen at the point located at the predetermined distance D1 before the merging section 23, which may make it impossible to determine the traffic situation of the merging destination lane 22.

Therefore, the merging assistance executability determination unit 32 may determine that merging assistance control is not executable when the difference θ between the traveling direction 41 of the merging lane 21 at the point located at the predetermined distance D1 before the merging section 23 and the traveling direction 42 of the merging destination lane 22 is a predetermined threshold value or more.

The threshold value of the difference θ may be set on the basis of a threshold value L3 of a length of a range where the traffic situation of the merging destination lane 22 should be detected by the external sensor 2.

Figure 8:
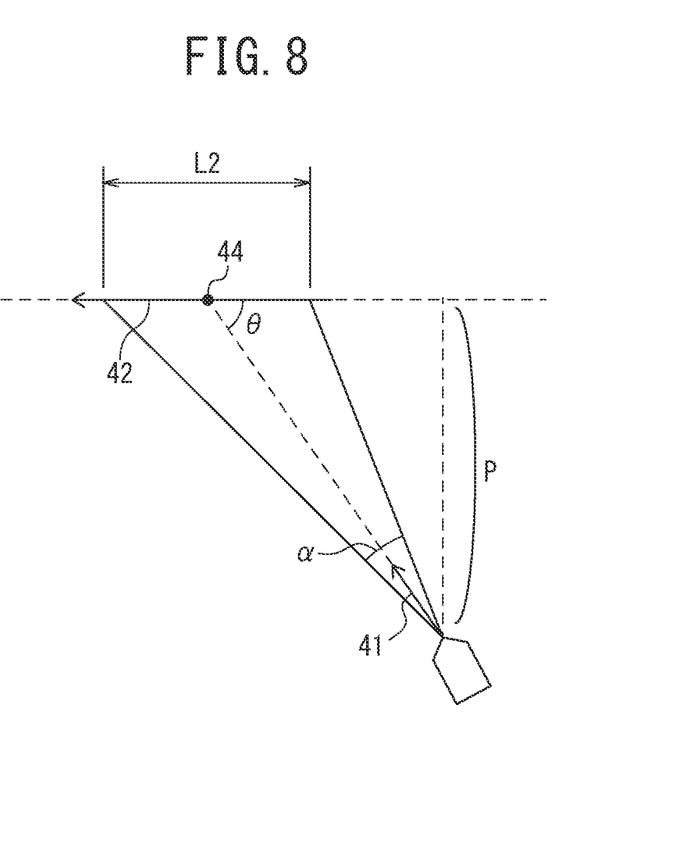
FIG. 8 is an illustrative diagram of a condition for not executing merging assistance control.

Reference will be made to FIG. 8. For example, assume that the detection range of the external sensor 2 is a range of an azimuth angle width α centered on the traveling direction 41 of the host vehicle 20, and a length of a perpendicular line from the point located at the predetermined distance D1 before the merging section 23 to an extended line of the traveling direction 42 of the merging destination lane 22 is P.

The length L2 of the detection range of the external sensor 2 in the merging destination lane 22 can be obtained by the following equation (1):

$$L2 = P(\tan(90°-\theta+\alpha/2) - \tan(90°-\theta-\alpha/2)) \quad (1)$$

The threshold value of the difference θ can be calculated as an upper limit value of a range of the difference θ where the length L2 is longer than the threshold value L3.

Reference will be made to FIG. 7. A distance from the point located at the predetermined distance D1 before the merging section 23 to the merging destination lane 22 is denoted by D2.

When the distance D2 is too long, a detection resolution of the other vehicles 29 in the merging destination lane 22 within the detection range 43 of the external sensor 2 decreases, which may make it impossible to determine the traffic situation of the merging destination lane 22.

Therefore, the merging assistance executability determination unit 32 may determine that merging assistance control is not executable when the distance D2 from the point located at the predetermined distance D1 before the merging section 23 to the merging destination lane 22 is a predetermined value or more. Reference sign 44 indicates a point where an extended line of the traveling direction 41 of the travel lane 21 at the point located at the predetermined distance D1 before the merging section 23 intersects the merging destination lane 22.

Additionally, the merging assistance executability determination unit 32 may determine that merging assistance control is not executable also when the road map data of the merging section 23 cannot be acquired or when the travel control unit 8 has no merging assistance function.

The merging assistance executability determination unit 32 outputs the determination result to the deceleration method determination unit 36.

The front vehicle recognition unit 33 acquires a position of a front vehicle 26 traveling in front of the host vehicle 20 in the merging lane 21 on the basis of the surrounding environment information output by the external sensor 2 (see FIG. 2). In addition, the front vehicle recognition unit 33 estimates a speed of the front vehicle 26 on the basis of the position information about the front vehicle 26, and estimates an acceleration of the front vehicle 26 from the speed information about the front vehicle 26. The front vehicle recognition unit 33 may directly estimate the speed of the front vehicle 26 without estimating from the position information. The front vehicle recognition unit 33 may acquire the position information, speed information, and acceleration information about the front vehicle 26 by the communication device 6.

The front vehicle recognition unit 33 outputs the position information, speed information, and acceleration information about the front vehicle 26 to the deceleration method determination unit 36.

The rear vehicle estimation unit 34 acquires a position information and a speed information about a rear vehicle 27 traveling behind the host vehicle 20 in the merging lane 21 on the basis of the surrounding environment information output by the external sensor 2 (see FIG. 2). Note that the rear vehicle estimation unit 34 may estimate the position information and speed information about the rear vehicle 27 on the basis of the position and speed of the host vehicle 20 without depending on the surrounding environment information output by the external sensor 2. The rear vehicle estimation unit 34 may acquire the position information and speed information about the rear vehicle 27 by the communication device 6.

The rear vehicle estimation unit 34 outputs the position information and speed information about the rear vehicle 27 to the deceleration method determination unit 36.

The vehicle speed estimation unit 35 estimates the speed of the host vehicle on the basis of the wheel speed of the host vehicle 20 detected by the wheel speed sensor 13. The vehicle speed estimation unit 35 outputs the speed information of the host vehicle to the deceleration method determination unit 36.

When the merging assistance executability determination unit 32 determines that merging assistance control is not executable, the deceleration method determination unit 36 determines a deceleration method for decelerating the speed of the host vehicle 20 down to the predetermined speed v0 or less before the host vehicle 20 passes through the starting point 24 of the merging section 23 at the latest.

Specifically, the deceleration method determination unit 36 determines the predetermined speed v0, a deceleration completion point, a deceleration d0, and a deceleration starting point.

For example, the deceleration method determination unit 36 may calculate the predetermined speed v0 on the basis of a lowest speed among the speed of the front vehicle 26, a speed limit of the merging lane 21, and a speed limit of the merging destination lane 22.

For example, the predetermined speed v0 may be slower by 10 km/h or more than the lowest speed among the speed of the front vehicle 26, the speed limit of the merging lane 21, and the speed limit of the merging destination lane 22.

Additionally, for example, the predetermined speed v0 may be slower by 20% or more than the lowest speed among the speed of the front vehicle 26, the speed limit of the merging lane 21, and the speed limit of the merging destination lane 22.

In addition, the predetermined speed v0 may be an average value between the lowest speed among the speed of the front vehicle 26, the speed limit of the merging lane 21, and the speed limit of the merging destination lane 22 and a legal slow speed (10 km/h).

However, when the predetermined speed v0 calculated as above is lower than the legal slow speed, the deceleration method determination unit 36 may reset the predetermined speed v0 to a slower one of either the legal slow speed or the speed of the front vehicle 26.

Next, the deceleration method determination unit 36 calculates the deceleration completion point for finishing decelerating the speed of the host vehicle 20 down to the predetermined speed v0.

For example, the deceleration method determination unit 36 may use the starting point 24 of the merging section 23 as the deceleration completion point. In this case, the host vehicle is decelerated down to the predetermined speed v0 at a constant deceleration d0 from a deceleration starting point before the starting point 24.

For example, the deceleration method determination unit 36 may use, as the deceleration completion point, a point located at a predetermined distance before the starting point 24 of the merging section 23. In this case, the speed of the host vehicle may be maintained at the predetermined speed v0 from the deceleration completion point to the starting point 24.

For example, the deceleration method determination unit 36 may determine the deceleration completion point so that when the host vehicle accelerates at a predetermined acceleration rate a from the deceleration completion point, the speed of the host vehicle can reach a speed limit v1 of the merging destination lane 22 by the time the host vehicle passes through the starting point 24.

Specifically, a point at a predetermined distance D determined by the following equation (2) before the starting point 24 may be determined as the deceleration completion point.

$$D=(v1^2-v0^2)/2a \qquad (2)$$

The acceleration a may be set within a range of acceleration used when a standard driver accelerates, and may be, for example, 0.8 m/s². Additionally, an acceleration pattern of the driver of the host vehicle may be recorded, and a value resulting from subtraction of a certain percentage from a highest acceleration within the recorded range of acceleration may be used as the acceleration a.

Next, the deceleration method determination unit 36 calculates the deceleration d0 for decelerating the speed of the host vehicle down to the predetermined speed v0.

When there is no front vehicle 26 in front of the host vehicle, the deceleration method determination unit 36 may determine the deceleration d0 so that the deceleration d0 is larger than a deceleration used when the travel control unit 8 decelerates the host vehicle in constant speed travel control.

For example, in the constant speed travel control by the travel control unit 8, when decelerating the host vehicle down to a set speed in the absence of another vehicle that becomes an obstacle in front of the host vehicle, the host vehicle is decelerated at a constant deceleration da. For example, when the set speed is changed to be lower, the constant speed travel control decelerates the host vehicle at the constant deceleration da.

For example, the deceleration method determination unit 36 may set the deceleration d0 to a value larger than the deceleration da. Decelerating at the deceleration d0 larger than the deceleration da used in the constant speed travel control can inform the driver that merging assistance control is not executed.

In the presence of the rear vehicle 27, the deceleration method determination unit 36 may calculate the deceleration d0 in consideration of an inter-vehicle time between the rear vehicle 27 and the host vehicle so that the inter-vehicle time between the rear vehicle 27 and the host vehicle is not too short.

For example, the deceleration method determination unit 36 may calculate a deceleration db for securing an inter-vehicle time of one second or more with respect to the rear vehicle 27 after one second according to the following equation (3):

$$db=2d-4vr+2vs \qquad (3)$$

In equation (3), d represents an inter-vehicle distance between the host vehicle before deceleration and the rear vehicle 27, vr represents the speed of the rear vehicle 27, and vs represents the speed of the host vehicle before deceleration.

The deceleration method determination unit 36 may determine the deceleration d0 so that the deceleration d0 is equal to or more than a smaller deceleration of either the deceleration da used in constant speed travel control or the deceleration db in accordance with the inter-vehicle time between the rear vehicle 27 and the host vehicle.

However, when a deceleration dr capable of turning on brake lights by regenerative brake is set as a lower limit of deceleration, and the deceleration da and the deceleration db are smaller than the deceleration dr, the deceleration d0 may be set as the deceleration dr. For example, the deceleration dr may be 0.7 m/s².

Furthermore, when an upper limit du of acceptable deceleration is predetermined, and the deceleration da and the deceleration db are larger than the upper limit du, the deceleration d0 may be set as the upper limit du. For example, the upper limit du of deceleration may be 1.3 m/s².

Note that the relationship between the upper limit du and lower limit dr of deceleration mentioned above and the rear vehicle 27 is merely one example. The upper limit du of deceleration may be determined within a range that does not make the occupant(s) feel uneasy due to sudden deceleration, and the lower limit dr of deceleration may be determined within a range that allows the driver to perceive that the host vehicle is decelerating. The relationship with the rear vehicle 27 may be determined such that a risk of collision by the rear vehicle 27 is not obviously increased.

On the other hand, when the front vehicle 26 is in front of the host vehicle, the deceleration method determination unit 36 may calculate the deceleration d0 on the basis of the deceleration db in accordance with the inter-vehicle time between the rear vehicle 27 and the host vehicle and a deceleration df of the front vehicle.

For example, the deceleration method determination unit 36 may determine which of the deceleration db and the deceleration df is larger. When the deceleration df is the deceleration db or more, the deceleration d0 may be determined so as to be the deceleration df or more. When the deceleration df is less than the deceleration db, the deceleration d0 may be determined so as to be the deceleration df or more and the deceleration db or less.

Next, on the basis of the calculated predetermined speed v0, deceleration completion point, and deceleration d0, the deceleration method determination unit 36 calculates a deceleration starting point that satisfies those mentioned above.

The deceleration method determination unit 36 outputs the calculated deceleration starting point, deceleration d0, and the predetermined speed v0 to the vehicle speed control unit 19 of the travel control unit 8.

The vehicle speed control unit 19 decelerates the host vehicle down to the predetermined speed v0 by decelerating at the constant deceleration d0 from the deceleration starting point output from the deceleration method determination unit 36.

For example, when the starting point 24 of the merging section 23 is the deceleration completion point, the vehicle speed control unit 19 may decelerate the host vehicle at the constant deceleration d0 from the deceleration starting point before the starting point 24 and set the speed of the host vehicle to the predetermined speed v0 at the starting point 24.

For example, when the deceleration completion point is a point located at the predetermined distance D before the starting point 24 of the merging section 23, the vehicle speed control unit 19 may decelerate the host vehicle at the constant deceleration d0 from the deceleration starting point, set the speed of the host vehicle to the predetermined speed v0 at the deceleration completion point, and then maintain the speed of the host vehicle at the predetermined speed v0 from the deceleration completion point to the starting point 24.

The vehicle speed control unit 19 determines whether the deceleration of the host vehicle is complete or not. After completion of the deceleration of the host vehicle, the vehicle speed control unit 19 determines whether manual merging operation by the driver in the merging section 23 is complete or not.

When the speed of the host vehicle is equal to or less than the set speed (for example, the speed limit of the merging destination lane 22) of the constant speed travel control by the travel control unit 8 after completion of the manual merging operation by the driver, the vehicle speed control unit 19 accelerates the host vehicle up to the set speed.

Note that when merging assistance control is not executed as a result of the determination of the merging assistance executability determination unit 32, the controller 10 may notify the driver that merging assistance control is not executed by means (for example, output or signal display of an audio signal) other than deceleration of the host vehicle at the deceleration d0.

Additionally, when the driver performs an acceleration operation (for example, an accelerator operation), the acceleration operation by the driver may be prioritized over the deceleration of the host vehicle.

(Operation)

Figure 9:
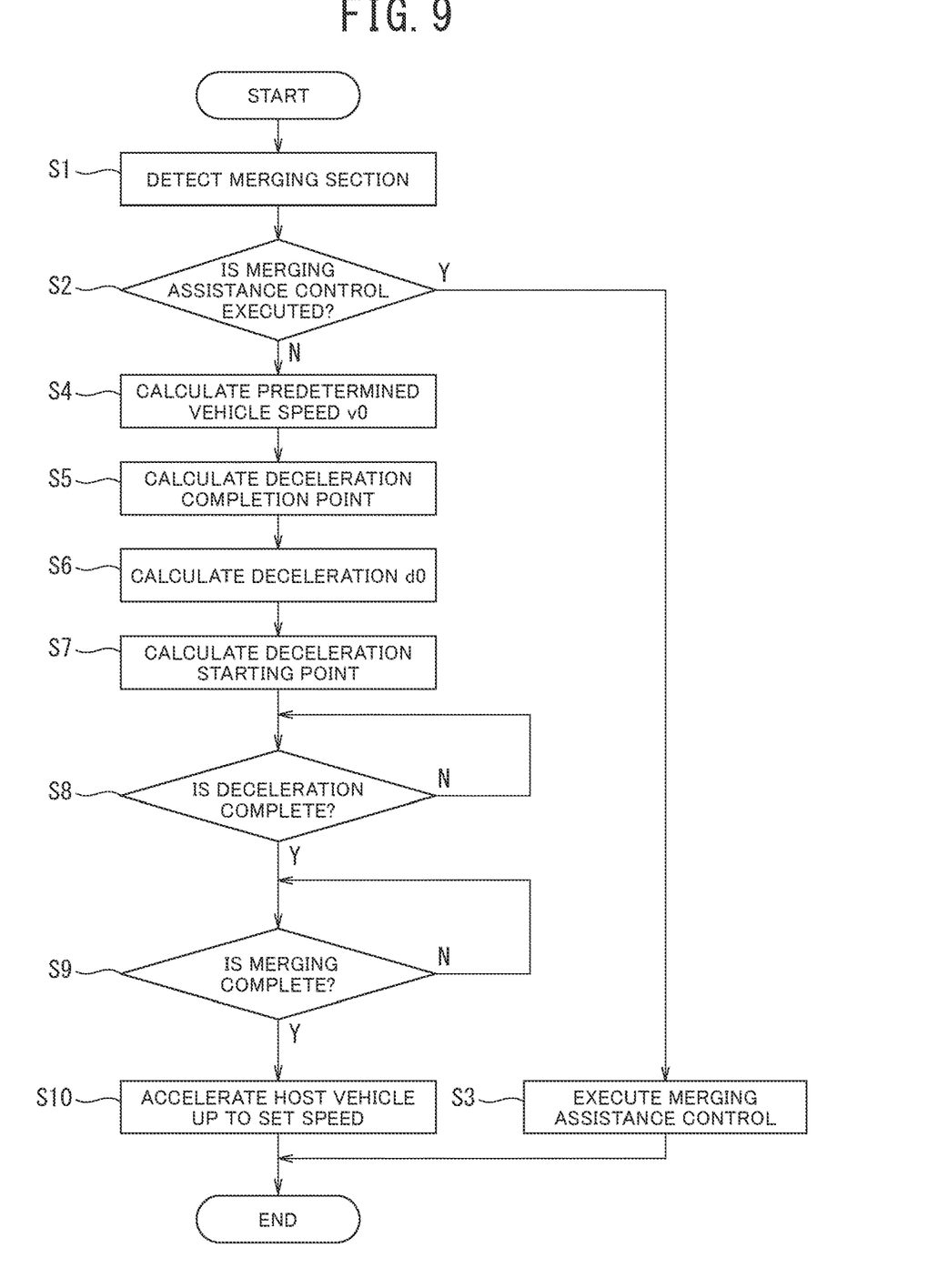
FIG. 9 is a flowchart of an example of a vehicle control method of an embodiment.

Next, an example of the vehicle control method of the embodiment will be described with reference to FIG. 9.

At step S1, the merging search unit 31 detects the merging section 23 present on a planned travel route that the host vehicle will travel in the future from the current position of the host vehicle.

At step S2, the merging assistance executability determination unit 32 determines whether or not to execute merging assistance control by the travel control unit 8 in the merging section 23 detected by the merging search unit 31. When executing the merging assistance control (step S2: Y), processing proceeds to step S3. When not executing the merging assistance control (step S2: N), processing proceeds to step S4.

At step S3, the travel control unit 8 executes the merging assistance control for assisting the host vehicle to change lanes from the merging lane 21 to the merging destination lane 22 in the merging section 23. Then, processing is ended.

On the other hand, at step S4, the deceleration method determination unit 36 calculates the predetermined speed v0.

At step S5, the deceleration method determination unit 36 calculates a deceleration completion point.

At step S6, the deceleration method determination unit 36 calculates the deceleration d0.

At step S7, the deceleration method determination unit 36 calculates a deceleration starting point.

The vehicle speed control unit 19 decelerates the host vehicle down to the predetermined speed v0 by decelerating at the constant deceleration d0 from the deceleration starting point output from the deceleration method determination unit 36.

At step S8, the vehicle speed control unit 19 determines whether the deceleration of the host vehicle is complete or not. When the deceleration of the host vehicle is complete (step S8: Y), processing proceeds to step S9. When the deceleration of the host vehicle is not complete yet (step S8: N), processing returns to step S8.

At step S9, the vehicle speed control unit 19 determines whether manual merging operation by the driver in the merging section 23 is complete or not. When the manual merging operation is complete (step S9: Y), processing proceeds to step S10. When the manual merging operation is not complete yet (step S9: N), processing returns to step S9.

At step S10, the vehicle speed control unit 19 accelerates the host vehicle up to a set speed. Then, processing is ended.

Effects of Embodiment

1) The merging search unit 31 detects, on the planned travel route of the host vehicle 20, the merging section 23 in which the merging lane 21 in which the host vehicle 20 is traveling merges with the merging destination lane 22. The merging assistance executability determination unit 32 determines whether or not to execute merging assistance control for assisting the host vehicle 20 to change lanes into the merging destination lane 22 in the merging section 23. When the merging assistance control is determined not to be executed in the merging section 23, the deceleration method determination unit 36 and the vehicle speed control unit 19 control the speed of the host vehicle 20 to be the predetermined speed v0 or less before the host vehicle 20 passes through the starting point 24 of the merging section 23.

In this way, by setting the speed of the host vehicle 20 to the predetermined speed v0 or less before the host vehicle 20 passes through the starting point 24 of the merging section 23, it is possible to secure a section length that allows the driver to accelerate the host vehicle in the merging section 23. This facilitates the driver to perform speed adjustment for changing lanes only by acceleration operation.

If speed adjustment for changing lanes is performed by both an acceleration operation (for example, an accelerator operation) and a braking operation (for example, a brake operation), a pedal changing operation between the accelerator pedal and the brake pedal is complicated. Performing the speed adjustment only by acceleration operation can avoid the complicated pedal changing operation.

Particularly, when changing pedals from the brake pedal to the accelerator pedal, it is difficult to predict acceleration with respect to an amount of stepping on the accelerator pedal. Additionally, at the time of changing pedals from the brake pedal to the accelerator pedal, the rotational speed of the engine is low, so that an expected acceleration may not be obtainable.

By performing the speed adjustment only by acceleration operation, the amount of stepping on the accelerator pedal is continuously adjusted, which facilitates prediction of acceleration of the host vehicle.

In addition, the travel control unit 8 stops constant speed travel control when the driver performs a braking operation (for example, a brake pedal operation). Accordingly, when a braking operation is performed for merging, not only is merging assistance control not be executed, but also constant speed travel control is stopped.

Performing the speed adjustment only by acceleration operation enables constant speed travel control to be continued even without execution of merging assistance control.

(2) The predetermined speed v0 may be slower by 10 km/h or more than the lowest speed among the speed limit of the merging lane 21 in which the host vehicle 20 is traveling, the speed limit of the merging destination lane 22, and the travel speed of the front vehicle 26 traveling in front of the host vehicle 20.

Limiting the speed of the host vehicle 20 to such a predetermined speed v0 enables the driver to be immediately notified that merging assistance control is not executed.

(3) When merging assistance control is determined not to be executed in the merging section 23, the deceleration method determination unit 36 and the vehicle speed control unit 19 reduce the speed of the host vehicle 20 down to the predetermined speed v0 before the host vehicle 20 passes through the starting point 24.

Decelerating the host vehicle 20 down to such a predetermined speed v0 enables the driver to be immediately notified that merging assistance control is not executed.

(4) The deceleration method determination unit 36 may determine the deceleration completion point for finishing decelerating the speed of the host vehicle 20 down to the predetermined speed so that when the host vehicle 20 accelerates at the predetermined acceleration a from the deceleration completion point, the speed of the host vehicle 20 can reach the speed limit of the merging destination lane 22 by the time the host vehicle 20 passes through the starting point 24.

As a result, deceleration is completed so that the host vehicle 20 can accelerate up to a speed necessary to merge to the starting point 24 of the merging section 23 at the predetermined acceleration a. Thus, the driver can perform a merging operation by an acceleration operation that does not cause any discomfort.

(5) The travel control unit 8 may have the automatic constant speed travel function for causing the host vehicle 20 to travel at a set speed. The deceleration method determination unit 36 may set the deceleration d0 for decelerating the speed of the host vehicle 20 down to the predetermined speed v0 larger than the deceleration da for decelerating by the automatic constant speed travel function when the set speed is lowered.

Decelerating the host vehicle 20 at such a large deceleration d0 enables the driver to be immediately notified that merging assistance control is not executed.

(6) The travel control unit 8 may have the automatic constant speed travel function for causing the host vehicle 20 to travel at a set speed. The vehicle speed control unit 19 accelerates the host vehicle 20 up to the set speed when the speed of the host vehicle 20 is equal to or less than the set speed after completion of manual merging operation by the driver in the merging section 23.

As a result, traveling at the set speed by automatic constant speed travel can be restarted after the manual merging operation by the driver is completed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1: Vehicle control device
2: External sensor
3: Internal sensor
4: Positioning device
5: Map database
6: Communication device
7: Navigation system
8: Travel control unit
9: Actuator
10: Controller
11: Camera
12: Distance measuring device
13: Wheel speed sensor
14: Processor
15: Storage device
16: Steering actuator
17: Accelerator position actuator
18: Brake control actuator
19: Vehicle speed control unit
20: Host vehicle
21: Merging lane
22: Merging destination lane
23: Merging section
24: Starting point
25: Ending point
26: Front vehicle
27: Rear vehicle
31: Merging search unit
32: Merging assistance executability determination unit
33: Front vehicle recognition unit
34: Rear vehicle estimation unit
35. Vehicle speed estimation unit
36: Deceleration method determination unit

The invention claimed is:

1. A vehicle control method comprising:
   detecting, on a planned travel route of a host vehicle, a merging section in which a travel lane in which the host vehicle is traveling merges with another lane;
   determining, before starting merging assistance control for assisting the host vehicle to change lanes into the other lane in the merging section, whether or not to execute the merging assistance control;
   when a determination is made that the merging assistance control is not to be executed in the merging section, determining whether or not a speed of the host vehicle is higher than a predetermined speed, the predetermined speed being set to be larger than 0 and lower than a speed limit of the travel lane of the host vehicle; and
   when the determination is made that the merging assistance control is not to be executed in the merging section and the speed of the host vehicle is determined to be higher than the predetermined speed, controlling the speed of the host vehicle so that the host vehicle passes through a starting point of the merging section after decelerating the host vehicle down to the predetermined speed.

2. The vehicle control method according to claim 1, wherein the predetermined speed is slower by 10 km/h or more than a lowest speed among the speed limit of the travel lane in which the host vehicle is traveling, a speed limit of the other lane, and a travel speed of a front vehicle traveling in front of the host vehicle.

3. The vehicle control method according to claim 1, comprising determining a deceleration completion point for finishing decelerating the speed of the host vehicle down to the predetermined speed so that when the host vehicle accelerates at a predetermined acceleration from the deceleration completion point, the speed of the host vehicle can reach a speed limit of the other lane by a time the host vehicle passes through the starting point.

4. The vehicle control method according to claim 3, wherein the host vehicle has an automatic constant travel speed feature for causing the host vehicle to travel at a set speed, in which a deceleration for decelerating the speed of the host vehicle down to the predetermined speed is set larger than a deceleration for decelerating by the automatic constant travel speed feature when the set speed is lowered.

5. The vehicle control method according to claim 3, wherein the host vehicle has an automatic constant travel speed feature for causing the host vehicle to travel at a set speed, in which when the speed of the host vehicle is equal to or less than the set speed after completion of manual merging operation by a driver in the merging section, the host vehicle is accelerated up to the set speed.

6. A vehicle control device comprising:
   an actuator configured to control a speed of a host vehicle; and
   a controller configured to:
      detect a merging section in which a travel lane of the host vehicle merges with another lane on a planned travel route of the host vehicle;
      determine, before starting merging assistance control for assisting the host vehicle to change lanes into the other lane in the merging section, whether or not to execute the merging assistance control;
      when a determination is made that the merging assistance control is not to be executed in the merging section, determine whether or not a speed of the host vehicle is higher than the predetermined speed, the predetermined speed being set to be larger than 0 and lower than a speed limit of the travel lane of the host vehicle; and
      when the determination is made that the merging assistance control is not to be executed in the merging section and the speed of the host vehicle is determined to be higher than the predetermined speed, control the actuator so that the host vehicle passes through a starting point of the merging section after decelerating the host vehicle down to the predetermined speed.

* * * * *